United States Patent
Pieper et al.

(10) Patent No.: US 10,294,549 B2
(45) Date of Patent: *May 21, 2019

(54) SOFT MAGNETIC ALLOY AND METHOD FOR PRODUCING SOFT MAGNETIC ALLOY

(75) Inventors: Witold Pieper, Renningen (DE); Niklas Volbers, Bruchkoebel (DE); Joachim Gerster, Alzenau (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,169

(22) Filed: Jun. 29, 2012

(65) Prior Publication Data

US 2013/0000794 A1    Jan. 3, 2013

Related U.S. Application Data

(60) Provisional application No. 61/503,931, filed on Jul. 1, 2011.

(51) Int. Cl.
| | |
|---|---|
| *C22C 30/00* | (2006.01) |
| *H01F 1/147* | (2006.01) |
| *C22C 19/07* | (2006.01) |
| *C22C 38/00* | (2006.01) |
| *C22C 38/02* | (2006.01) |
| *C22C 38/04* | (2006.01) |
| *C22C 38/10* | (2006.01) |
| *C22C 38/12* | (2006.01) |
| *C22F 1/10* | (2006.01) |
| *H02K 1/02* | (2006.01) |

(52) U.S. Cl.
CPC .............. *C22C 30/00* (2013.01); *C22C 19/07* (2013.01); *C22C 38/004* (2013.01); *C22C 38/02* (2013.01); *C22C 38/04* (2013.01); *C22C 38/10* (2013.01); *C22C 38/105* (2013.01); *C22C 38/12* (2013.01); *C22F 1/10* (2013.01); *H01F 1/14708* (2013.01); *H02K 1/02* (2013.01)

(58) Field of Classification Search
CPC ................................ C22C 19/07; C22C 30/00
USPC ........ 148/100, 120–122, 306–311, 313, 557, 148/552, 315; 420/580
See application file for complete search history.

(56) References Cited

U.S. PATENT DOCUMENTS

| | | | |
|---|---|---|---|
| 3,634,072 A * | 1/1972 | Ackermann et al. | 420/581 |
| 4,933,026 A | 6/1990 | Rawlings et al. | |
| 5,501,747 A | 3/1996 | Masteller et al. | |
| 5,527,399 A * | 6/1996 | Manning et al. | 148/120 |

(Continued)

FOREIGN PATENT DOCUMENTS

JP    9-228007 A    9/1997

OTHER PUBLICATIONS

A.V. Major et al., "High Saturation Ternary Cobalt-Iron Based Alloys", IEEE Transactions on Magnetics, vol. 24, No. 2, Mar. 1988, pp. 1856-1858.

*Primary Examiner* — Jie Yang
(74) *Attorney, Agent, or Firm* — Dickinson Wright PLLC

(57) ABSTRACT

A soft magnetic alloy is provided that consists essentially of 47 weight percent≤Co≤50 weight percent, 1 weight percent≤V≤3 weight percent, 0 weight percent≤Ni≤0.2 weight percent, 0.08 weight percent≤Nb≤0.12 weight percent, 0 weight percent≤C≤0.005 weight percent, 0 weight percent≤Mn≤0.1 weight percent, 0 weight percent≤Si≤0.1 weight percent, remainder Fe.

30 Claims, 13 Drawing Sheets

(56) References Cited

U.S. PATENT DOCUMENTS

| | | | |
|---|---|---|---|
| 6,146,474 A | 11/2000 | Coutu et al. | |
| 7,582,171 B2 * | 9/2009 | Gerster et al. | 148/315 |
| 2002/0069944 A1 | 6/2002 | Weihs et al. | |
| 2005/0268994 A1 | 12/2005 | Gerster et al. | |
| 2008/0042505 A1 * | 2/2008 | Gerster et al. | 310/152 |
| 2013/0000797 A1 * | 1/2013 | Pieper et al. | 148/557 |

* cited by examiner

SOFT MAGNETIC ALLOY AND METHOD FOR PRODUCING SOFT MAGNETIC ALLOY

This application claims benefit of the filing date of U.S. Provisional Application Serial No. 61/503931, filed Jul. 1, 2011, the entire contents of which are incorporated herein by reference for all purposes.

BACKGROUND

1. Field

Disclosed herein are soft magnetic alloy compositions containing iron, cobalt, vanadium and niobium with low amounts, if any, of carbon. Also disclosed herein are methods for manufacturing such soft magnetic alloys. Also disclosed are annealed alloys of the composition noted above and having high yield strengths and magnetic properties suitable for rotating electrical devices, wherein the yield strength can be adjusted by varying the annealing temperature.

2. Description of Related Art

A ferromagnetic material that can be magnetized, but tends not to remain magnetized is described as magnetically soft. When a magnetically soft material is magnetised in a magnetic field and then removed from the magnetic field, it loses most of the magnetism exhibited while in the field. A magnetically soft material preferably displays a low hysteresis loss, high magnetic permeability and a high magnetic saturation induction. Magnetically soft materials are used in various static and rotating electrical devices, such as motors, generators, alternators, transformers and magnetic bearings.

U.S. Pat. No. 5,501,747 discloses a high strength, soft magnetic iron-cobalt-vanadium based alloy which further comprises 0.15 weight percent to 0.5 weight percent niobium and 0.003 weight percent to 0.02 weight percent carbon. This alloy is disclosed as having a combination of yield strength, magnetic properties and electrical properties which enables it to be used for the rotating part, such as a rotor, of a rotating electrical machine. When the alloy is annealed at a temperature of not more than about 740° C. for not more than about 4 hours, it has a room temperature yield strength of at least 620 MPa.

However, further soft magnetic alloys having a combination of a high yield strength and magnetic properties suitable for applications, such as rotating electrical devices, are desirable.

SUMMARY

A soft magnetic alloy is provided that consists essentially of 47 weight percent$\leq$Co$\leq$50 weight percent, 1 weight percent$\leq$V$\leq$3 weight percent, 0 weight percent$\leq$Ni$\leq$0.2 weight percent, 0.08 weight percent$\leq$Nb$\leq$0.12 weight percent, 0 weight percent$\leq$C$\leq$0.005 weight percent, 0 weight percent$\leq$Mn$\leq$0.1 weight percent, 0 weight percent$\leq$Si$\leq$0.1 weight percent, remainder Fe.

The alloy is based on a 49% Co-2% V—Fe-type alloy which further includes niobium within the range of 0.08 to 0.12 weight percent, a maximum carbon content of 0.005 weight percent and optionally Ni up to 0.2 weight percent.

The elements manganese and silicon are also optional and may be added in order to reduce the oxygen content of the alloy.

Oxygen is not intentionally added to the alloy, but may be present as an impurity in amounts up to 0.009 weight percent. Further impurity elements such as one or more of Cr, Cu, Mo, Al, S, Ti, Ce, Zr, B, N, Mg, Ca or P may be present in a total amount of not more than 0.5 weight percent.

For alloys of the 49% Co-2% V-49% Fe-type, the annealing temperature is generally observed to have opposing effects on the mechanical properties and the magnetic properties. In particular, the yield strength is observed to increase for decreasing annealing temperatures, whilst the magnetic properties are improved by annealing at higher temperatures. The optimum mechanical properties are achieved at lower temperatures than the optimum magnetic properties.

A combination of a niobium content with the range of 0.08 to 0.12 weight percent and a carbon content of less than 0.005 weight percent, or preferably less than 0.003 weight percent, provides a soft magnetic alloy with a yield strength that can be adjusted as desired over a range of 200 MPa to 450° C. by appropriate selection of the annealing conditions. At the same time, soft magnetic properties suitable for soft magnetic parts, such as a rotor or a stator, of a rotating electrical machine can be obtained.

One explanation for this behaviour is that by reducing the carbon content, the formation of Laves phases (Co/Fe, Nb) is favoured whilst the formation of carbides is reduced, thus enabling a suitably high yield strength to be obtained without resulting in a worsening of the magnetic properties, in particular losses, to such a degree that they are no longer suitable for use in electric machines.

In a rotating electrical machine, the rotor typically requires a higher yield strength than is required for the stator as the rotor rotates during use and is subjected to centrifugal forces. It may be useful if the yield strength of the rotor is sufficiently high that the material of the rotor remains below its elastic limit despite the centrifugal forces. In contrast, the stator is static and not subjected to centrifugal force so that the stator may have a lower yield strength than that of the rotor.

Usefully, the yield strength and the magnetic properties of the soft magnetic alloy according to the invention can be adjusted by annealing the parts for the rotor and for the stator at different annealing temperatures so that the same composition can be used for both the rotor and the stator of an electrical machine.

In a further embodiment, the upper limit of the carbon content is reduced to 0.003 weight percent so that the soft magnetic alloy comprises a carbon content of 0 weight percent$\leq$C$\leq$0.003 weight percent. In further embodiments, the soft magnetic alloy includes carbon in the range of 0 weight percent<C$\leq$0.005 weight percent or 0 weight percent<C$\leq$0.003 weight percent. Reducing the carbon content may be useful in improving the magnetic properties.

In a further embodiment, the soft magnetic alloy includes nickel within the range of 0 weight percent<Ni$\leq$0.2 weight percent.

As discussed above, manganese and silicon are optional. In some embodiments the soft magnetic alloy includes manganese and/or silicon within a range of 0 weight percent<Mn$\leq$0.07 weight percent and/or 0 weight percent<Si$\leq$0.05 weight percent.

In an embodiment, the soft magnetic alloy comprises a yield strength (0.2% strain) of between 200 MPa and 450 MPa in an annealed state. The yield strength can be adjusted as desired by adjusting the annealing conditions, in particular, by selecting a suitable annealing temperature.

The soft magnetic alloys having a composition within the ranges given above display a linear dependence of the yield strength with annealing temperature. This feature is not displayed by commercially available 49% Co/49% Fe/2% V alloys with additions of about 0.05 Nb and 100 ppm C such as Hiperco 50. These commercially available alloys are referred to as reference alloys in the following.

In an embodiment, the soft magnetic alloy comprises a yield strength (0.2% strain) that is a linear function of annealing temperature over an annealing temperature range of 740° C. to 865° C. or 730° C. to 900° C.

In an embodiment, the soft magnetic alloy, in an annealed state, comprises a yield strength (0.2% strain) that lies within ±10% of a linear function of yield strength (0.2% strain) against annealing temperature obtained for the soft magnetic alloy.

In an annealed state, the soft magnetic alloy may comprise a resistivity of at least 0.4 μΩm and/or an induction B(8 A/cm) of at least 2.12 T.

As discussed above, the soft magnetic alloy comprises a combination of mechanical strength and soft magnetic properties that are suitable for the soft magnetic parts of a rotating electrical machine. In an embodiment, the soft magnetic alloy is annealed such that it has, in the annealed state, an induction B(8 A/cm) of at least 2.12 T and a yield strength of at least 370 MPa. This combination of properties is suitable for a rotor of an electric machine.

In a particular embodiment, after annealing at a temperature in the range of 720° C. to 900° C., the soft magnetic alloy comprises a yield strength in the range of 200 MPa and 450 MPa, and a power loss density at 2 T and 400 Hz of less than 90 W/kg. In further embodiments, for an annealing temperature of 720° C., the power loss density at 2 T and 400 Hz is less than 90 W/kg and for an annealing temperature of 880° C. is less than 65 W/kg.

A stator for an electric motor and a rotor for an electric motor comprising a soft magnetic alloy according to one of the previously described embodiments is also provided. An electric motor comprising a stator and a rotor each comprising a soft magnetic alloy having a composition according to one of the previously described embodiments is also provided. The rotor and the stator may have the same composition, but differing mechanical properties and magnetic properties. This may be provided by annealing the rotor or parts forming the rotor under different annealing conditions compared to the stator or parts forming the stator.

The rotor and/or the stator may comprise a plurality of plates or layers that are stacked together to form a laminate.

The electric machine may be a motor, a generator, an alternator, or a transformer.

A method for manufacturing a soft magnetic alloy is provided which comprises providing a melt consisting essentially of 47 weight percent≤Co≤50 weight percent, 1 weight percent≤V≤3 weight percent, 0 weight percent≤Ni≤0.2 weight percent, 0.08 weight percent≤Nb≤0.12 weight percent, 0 weight percent≤C≤0.005 weight percent, 0 weight percent≤Mn≤0.1 weight percent, 0 weight percent≤Si≤0.1 weight percent, remainder Fe. This melt is cooled and solidified to form a blank. The blank is hot rolled, quenched from a temperature of above 730° C., and, afterwards, cold rolled. Subsequently, at least a portion of the blank is annealed at a temperature in the range of 730° C. to 880° C.

After cold rolling, the blank may have the form of a plate or ribbon. Pieces of the blank may be removed by stamping or cutting, for example, and the piece or pieces annealed at a suitably selected temperature to obtain the desired mechanical and magnetic properties.

In further embodiments, at least a portion of the blank is annealed at a temperature in the range of 740° C. to 865° C. or in the range of 730° C. to 790° C. or in the range of 800° C. to 880° C. The higher temperature range of 800° C. to 880° C. may be used when fabricating a stator from the soft magnetic alloy and the lower temperature range of 730° C. to 790° C. may be used when fabricating a rotor from the soft magnetic alloy.

In a further embodiment, a thickness reduction in the blank of about 90% is produced by the hot rolling of the blank. This thickness reduction may be selected so as to select the desired thickness reduction in the subsequent cold rolling step and to select the amount of deformation introduced into the soft magnetic alloy during cold rolling.

The blank may be hot rolled at a temperature in the range of 1100° C. to 1300° C. After hot rolling, the blank may be naturally cooled to room temperature. After hot rolling, the strip is quenched from a temperature above 730° C. to room temperature or to below room temperature. This may be carried out whilst the strip is cooling from the hot rolling temperature. Alternatively, the strip may be cooled to room temperature and afterwards reheated to a temperature above 730° C. and quenched to room temperature or to below room temperature.

After hot rolling and before cold rolling, the blank may be cleaned, for example pickled and/or mechanically worked, for example by sand blasting, to clean the surface. This improves the surface finish of the blank after cold rolling and may also aid in improving the magnetic properties of the alloy after annealing.

In an embodiment, a thickness reduction in the blank of 90% is produced by the cold rolling of the blank. After cold rolling, the thickness of the blank may lie in the range of 0.3 mm to 0.4 mm. This thickness is suitable for producing laminated articles such as laminated rotors and laminated stators for electric machines.

A method for manufacturing a semi-finished part is also provided that comprises performing the method according to one of the previously described embodiments and separating a portion of the blank to produce a semi-finished part.

A laminated article may be formed by assembling a plurality of semi-finished parts comprising a soft magnetic alloy according to one of the embodiments described above.

A rotor for an electric motor may be provided by annealing the soft magnetic alloy or the laminated article according to one of the previously described embodiments at a temperature of 730 to 790° C.

A stator for an electric motor may be provided by annealing the soft magnetic alloy or the laminated article according to one of the previously described embodiments at a temperature of 800° C. to 880° C.

BRIEF DESCRIPTION OF DRAWINGS

Specific examples and embodiments will now be described with reference to the accompanying drawings and tables.

DETAILED DESCRIPTION OF SPECIFIC EMBODIMENTS

The various embodiments disclosed herein can be more clearly understood with reference to the specific examples and the information contained in the Tables disclosed herein, wherein:

Table 1 illustrates comparison data for Hiperco 50 and VACODUR 50.

Table 2 illustrates magnetic and mechanical properties of the comparison alloys of table 1 after different annealing treatments.

Table 3 illustrates the composition, magnetic and mechanical properties of the sample alloys investigated.

Figure 18:
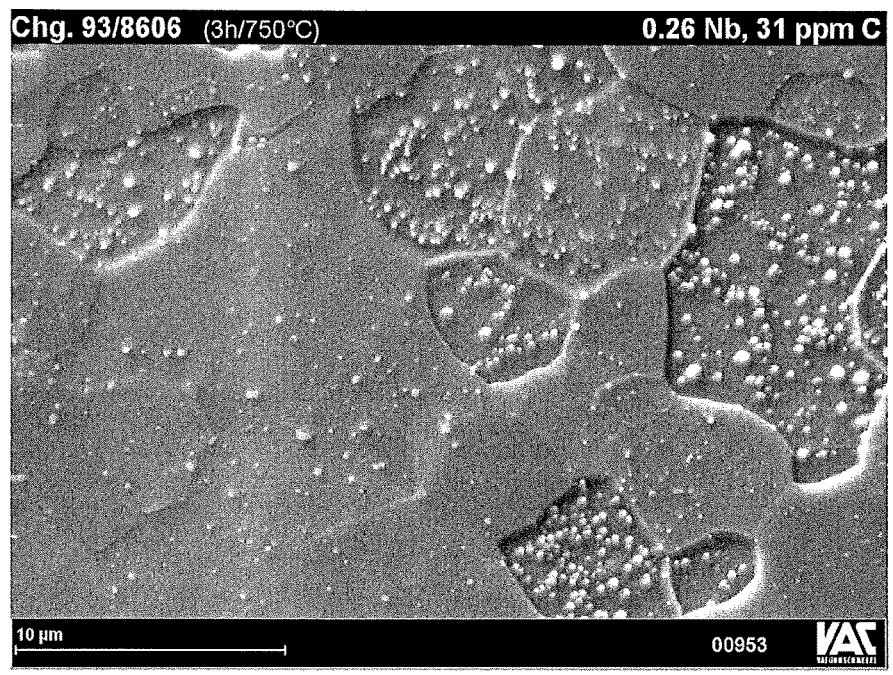
FIG. 18 illustrates a SEM micrograph of a comparison sample.

Table 4 illustrates the compositions of the alloys used in the embodiment illustrated in FIG. 18.

Table 5 illustrates values of the yield strength illustrated in the graph of FIG. 18.

A soft magnetic alloy is provided that consists essentially of 47 weight percent≤Co≤50 weight percent, 1 weight percent ≤V≤3 weight percent, 0 weight percent≤Ni≤0.2 weight percent, 0.08 weight percent≤Nb≤0.12 weight percent, 0 weight percent≤C≤0.005 weight percent, 0 weight percent≤Mn≤0.1 weight percent, 0 weight percent≤Si≤0.1 weight percent, remainder Fe.

The alloy may be fabricated by providing a melt consisting essentially of 47 weight percent≤Co≤50 weight percent, 1 weight percent≤V≤3 weight percent, 0 weight percent≤Ni≤0.2 weight percent, 0.08 weight percent≤Nb≤0.12 weight percent, 0 weight percent≤C≤0.005 weight percent, 0 weight percent≤Mn≤0.1 weight percent, 0 weight percent≤Si≤0.1 weight percent, remainder Fe, cooling and solidifying the melt and forming a blank. The blank is then hot rolled, for example at 1200° C., cooled and quenched from a temperature above 730° C. to room temperature. The blank is then cold rolled at room temperature to a final thickness of 0.35 mm, for example. Subsequently at least a portion of the blank is annealed at a temperature in the range of 730° C. to 880° C. to form a semi-finished product.

The annealing temperature is chosen so that it lies between the recrystallization temperature of around 720° C. and the phase transformation from the alpha, α, phase to the gamma, γ, phase at around 885° C. The annealing temperature is selected within this range so that the semi-finished product has the desired mechanical properties, in particular, the desired yield strength (0.2% strain), $Rp_{0.2}$, in combination with the desired magnetic properties, in particular, losses.

It is observed that a combination of a niobium content with the range of 0.08 to 0.12 weight percent and a carbon content of less than 0.005 weight percent, or preferably less than 0.003 weight percent, provides a soft magnetic alloy with a yield strength that can be adjusted as desired over a range of 200 MPa to 450° C. by appropriate selection of the annealing temperature. At the same time, good soft magnetic properties, in particular low losses, suitable for soft magnetic parts of rotating electrical machines can be obtained.

The yield strength of soft magnetic alloys having a niobium content within the range of 0.08 to 0.12 weight percent and a carbon content of less than 0.005 weight percent, or preferably less than 0.003 weight percent can be adjusted over a wider range that that achievable with the comparison composition of the reference alloys.

In a further embodiment, the yield strength is linearly dependent on the annealing temperature. This behaviour is not displayed by the comparison compositions of the reference alloys.

Usefully, the yield strength and the magnetic properties can be adjusted so that the same composition can be used for both the rotor and the stator of an electrical machine by annealing the parts for the rotor and for the stator at different annealing temperatures. For example, parts for a rotor may be annealed at 750° C. and have a higher yield strength than parts for the stator which are annealed at 870° C. In this example, the stator has clearly better magnetic properties than the rotor.

In a first set of embodiments, a plurality of soft magnetic alloys with a carbon content of 50 ppm maximum and differing niobium contents was fabricated.

Figure 1:
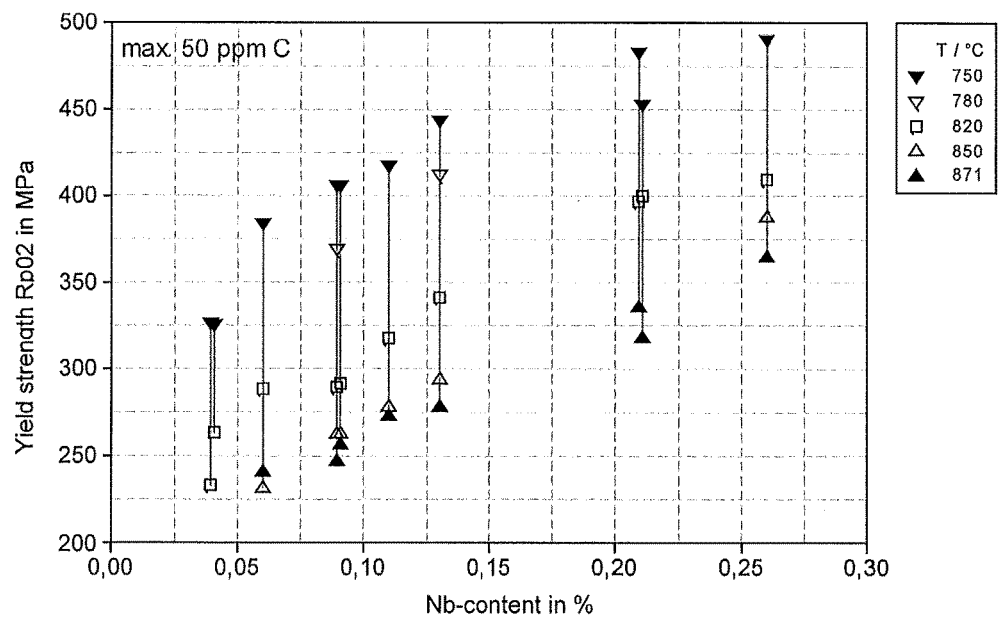
FIG. 1 illustrates a graph of yield strength vs. Nb-content for sample alloys with max. 50 ppm carbon.

FIG. 1 illustrates a graph of yield strength vs. Nb-content for sample alloys with a maximum carbon content of 50 ppm which were annealed at five different temperatures, 750° C., 780° C., 820° C., 850° C. and 871° C. The yield strength is highest for the alloys annealed at a lower temperature decreases with increasing temperature. There is general increase in the yield strength measured for an increase in niobium content.

Figure 2:
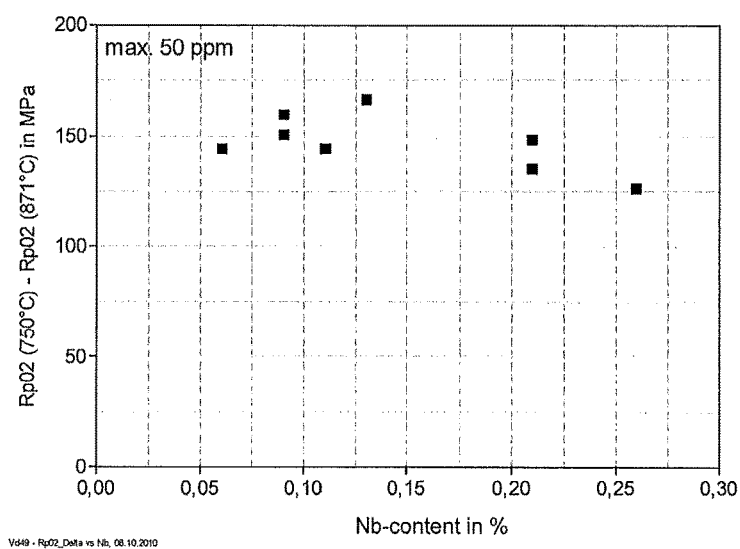
FIG. 2 illustrates a graph of range of yield strength vs. Nb-content for sample alloys with max. 50 ppm carbon.

FIG. 2 illustrates a graph of the range of yield strength obtainable by varying the annealing temperature vs. Nb-content for the samples of FIG. 1. The difference in the yield strength achievable by appropriate selection of the annealing temperature ranges between 126 and 166 MPa and is a little smaller for niobium contents of greater than around 0.2 weight percent.

Figure 3:
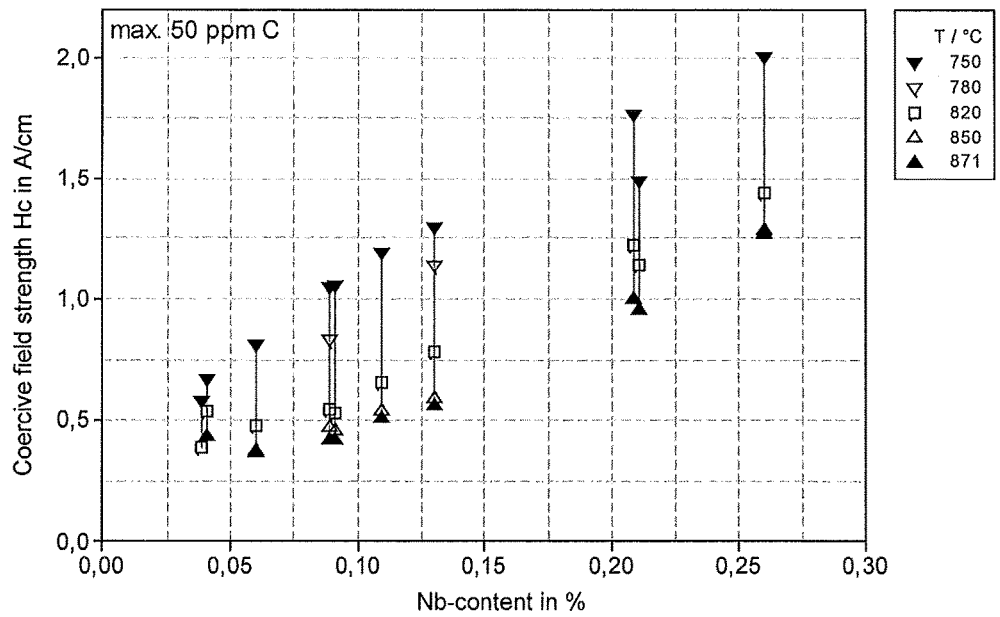
FIG. 3 illustrates a graph of coercive field strength vs. Nb-content for sample alloys with max. 50 ppm carbon.
Figure 4:
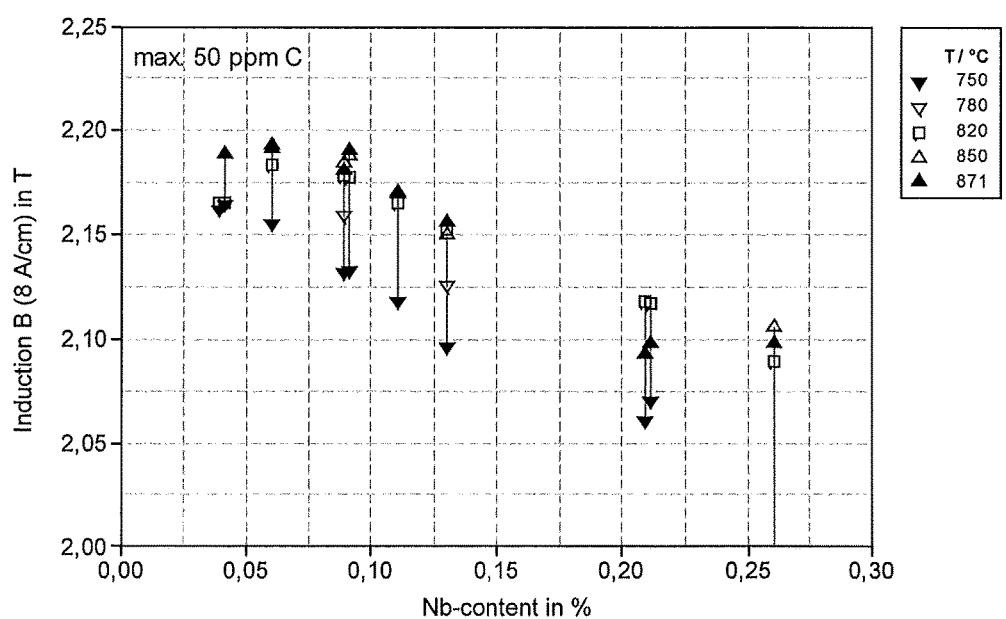
FIG. 4 illustrates a graph of Induction B(8 A/cm) vs. Nb-content for sample alloys with max. 50 ppm carbon.
Figure 5:
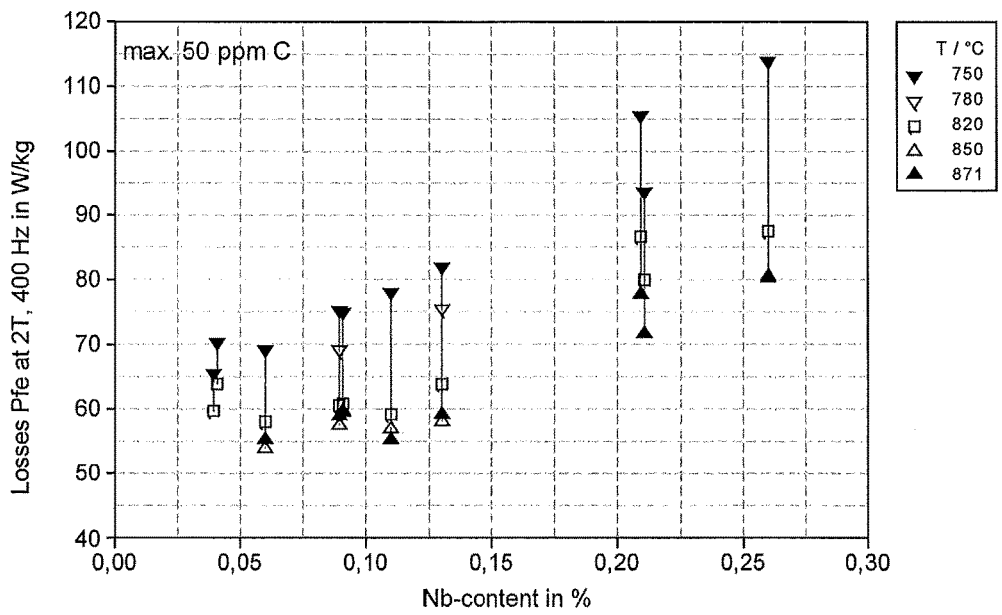
FIG. 5 illustrates a graph of losses at 2 T and 400 Hz vs. Nb-content for sample alloys with max. 50 ppm carbon.

The magnetic properties of these sample alloys are illustrated in FIGS. 3 to 5.

FIG. 3 illustrates a graph of coercive field strength vs. Nb-content, FIG. 4 illustrates a graph of induction B(8 A/cm) vs. Nb-content and FIG. 5 illustrates a graph of losses at 2 T and 400 Hz vs. Nb-content for samples illustrated in FIGS. 1 and 2.

FIG. 3 illustrates that the coercive field strength increases with increasing niobium content. Up to a niobium content of 0.12 weight percent, the increase in the coercive field strength after a heat treatment at 871° C. is relatively small. Therefore, a coercive field strength of less than 0.4 A/cm can be achieved with a niobium content of around 0.1 weight percent.

As is illustrated in FIG. 4, for an annealing temperature of 750° C., which leads to the highest yield strength, the magnetic induction decreases with increasing niobium content. The value of the induction which can be achieved after a treatment at 871° C. remains, however, relatively constant up to a niobium content of around 0.1 so that an induction of more than 2.15 T can be achieved with a niobium content of 0.13 weight percent.

FIG. 5 illustrates that the losses increase with increasing niobium content. However, the losses are relatively constant for niobium contents of between 0.04 and 0.11 for the samples annealed at 871° C.

In a second set of embodiments, the effect of the carbon content on the mechanical and magnetic properties of alloys with a niobium content in the range of 0.09 to 0.11 weight percent is investigated.

Figure 6:
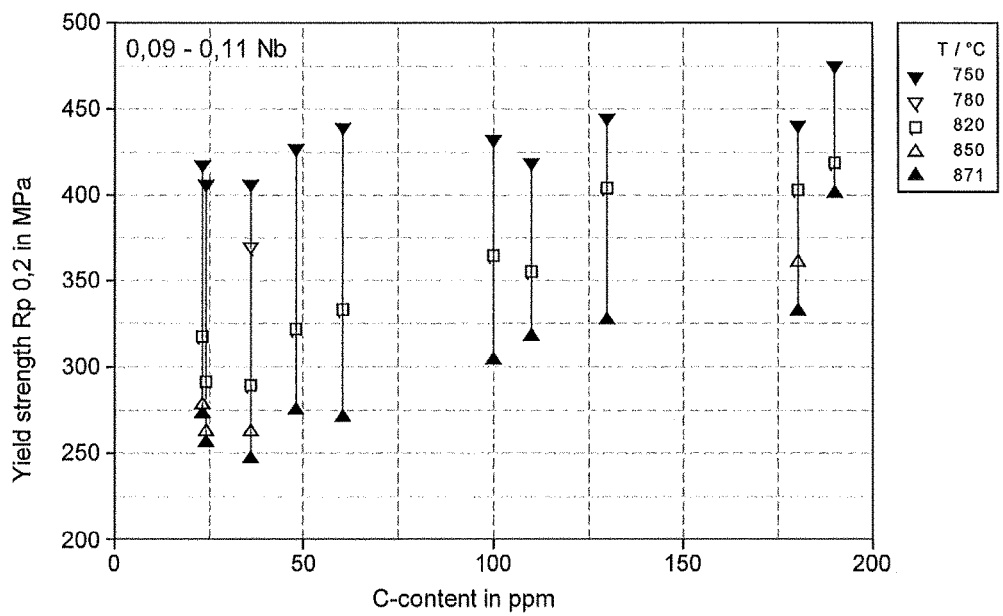
FIG. 6 illustrates a graph of yield strength vs. carbon content for sample alloys with 0.09-0.11% Nb.
Figure 7:
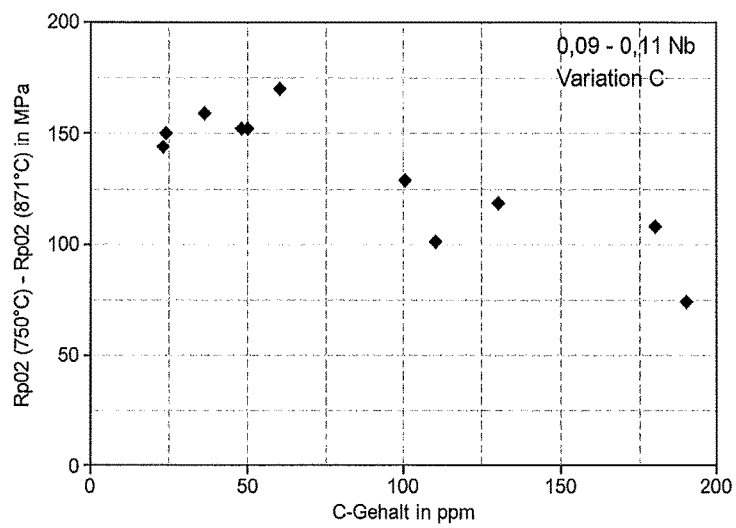
FIG. 7 illustrates a graph of range of yield strength vs. carbon content for sample alloys with 0.09-0.11% Nb.

FIG. 6 illustrates a graph of yield strength vs. carbon content for sample alloys with 0.09-0.11% Nb and FIG. 7 illustrates a graph of range of yield strength vs. carbon content for these sample alloys.

The samples of the second set of embodiments were annealed at the five different temperatures, 750° C., 780° C., 820° C., 850° C. and 871° C., used for the first set of embodiments.

FIG. 6 illustrates that the yield strength of the samples increases with increasing carbon content and that for an annealing temperature of 871° C. the yield strength increases from around 250 MPa for a carbon content of 30 ppm to 400 MPa for a carbon content of 180 ppm. For an annealing temperature of 750° C., the yield strength increases from around 400 MPa for 30 ppm carbon to 475 MPa for a carbon content of 180 ppm.

FIG. 7 illustrates that the range over which the yield strength can be adjusted for a given carbon content decreases with increasing carbon content so that for carbon contents of less than around 50 ppm, the yield strength is adjustable over a range of around 150 MPa. However, for a higher carbon content of around 100 ppm, the yield strength can only be adjusted within a range of around 120 MPa. Above a carbon content of around 100 ppm, the range decreases to less than 100 MPa.

Figure 8:
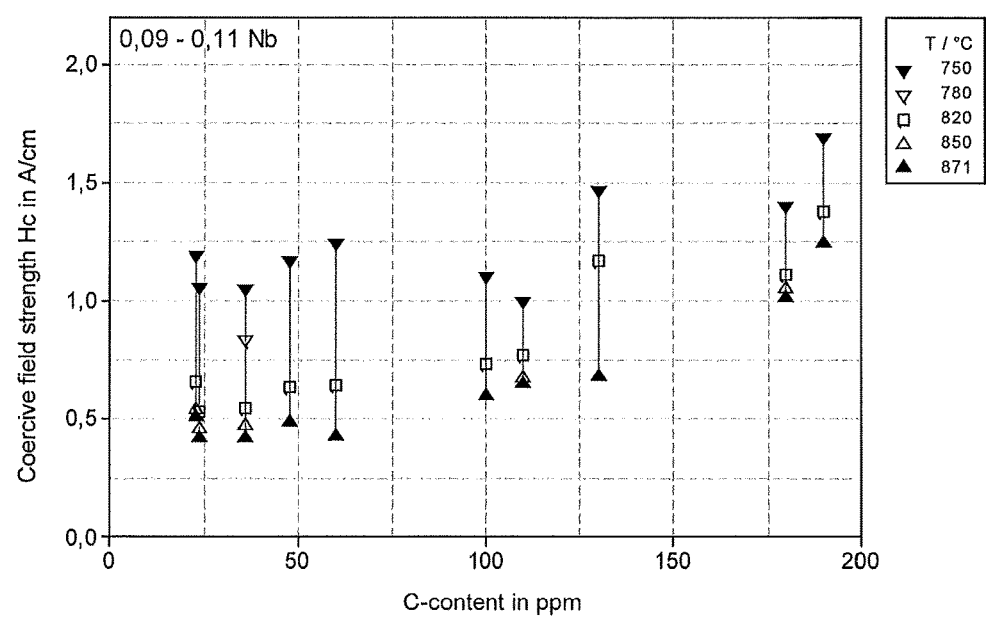
FIG. 8 illustrates a graph of coercive field strength vs. carbon content for sample alloys with 0.09-0.11% Nb.
Figure 9:
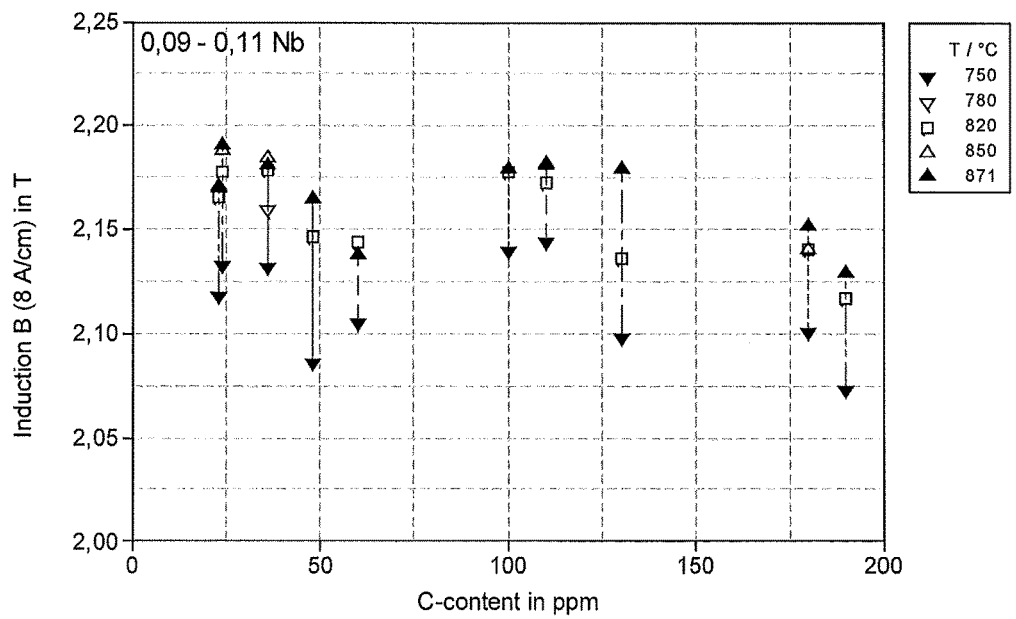
FIG. 9 illustrates a graph of induction B(8 A/cm) vs. carbon content for sample alloys with 0.09-0.11% Nb.
Figure 10:
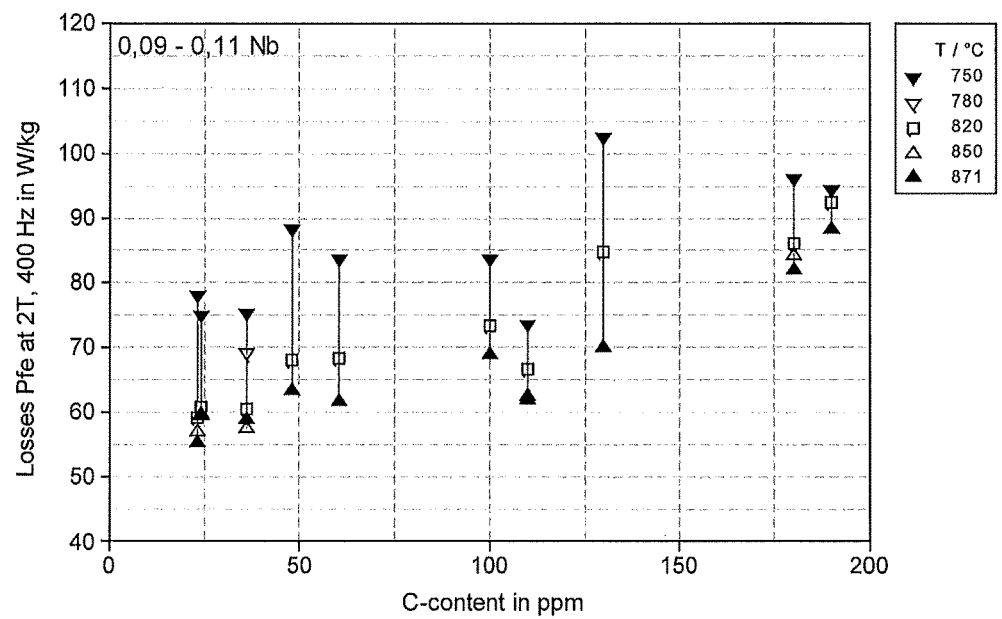
FIG. 10 illustrates a graph of losses at 2 T and 400 Hz vs. carbon content for sample alloys with 0.09-0.11% Nb.

Magnetic properties measured for samples of this second set of embodiments are illustrated in FIGS. 8 to 10.

FIG. 8 illustrates a graph of coercive field strength vs. C-content, FIG. 9 illustrates a graph of magnetic induction B(8 A/cm) vs. C-content and FIG. 10 illustrates a graph of losses at 2 T and 400 Hz vs. C-content for samples with a Niobium content of 0.09-0.11 weight percent.

FIG. 8 illustrates that the coercive field strength remains relatively constant for all of the annealing temperatures for carbon contents of up to about 60 ppm. FIG. 9 illustrates that the induction remains relatively constant for carbon contents of up to 130 ppm for samples heated 871° C. FIG. 10 illustrates that the losses increase with increasing carbon content.

In a third set of embodiments, the magnetic properties of an alloy comprising 0.09 to 0.11 weight percent niobium and a maximum of 50 ppm of carbon are compared with two reference samples commercially available under the names VACODUR 50 and HIPERCO 50. Table 1 illustrates the comparison data for the comparison samples. Table 2 illustrates magnetic and mechanical properties of the comparison alloy Hiperco 50 of Table 1 and an alloy according to the invention after different annealing treatments.

The magnetic properties are illustrated in graphs as a dependence of the yield strength.

Figure 11:
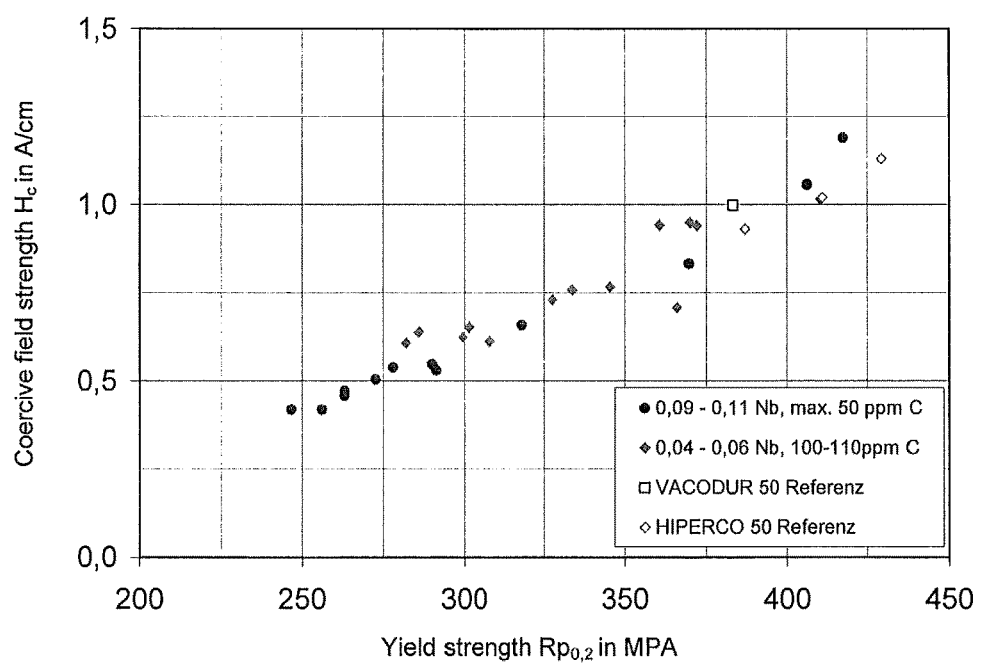
FIG. 11 illustrates a graph of coercive field strength vs. Yield strength for (a) a sample alloy with 0.09-0.110 Nb and max. 50 ppm carbon, (b) a sample alloy with 0.04-0.06% Nb and 100-110 ppm carbon (a HIPERCO 50-like composition), (c) VACODUR 50 comparison data, (d) HIPERCO 50 comparison data.

FIG. 11 illustrates a graph of coercive field strength vs. Yield strength for (a) sample alloys with 0.09-0.11% Nb and max. 50 ppm C, (b) sample alloys with 0.04-0.06% Nb, 100-110 ppm C (a HIPERCO 50-like alloy), (c) VACODUR 50 comparison data, (d) HIPERCO 50 comparison data.

FIG. 11 illustrates that the coercive field strength of the alloy according to the invention is lower in nearly the entire yield strength range than the samples with a higher carbon content.

Figure 12:
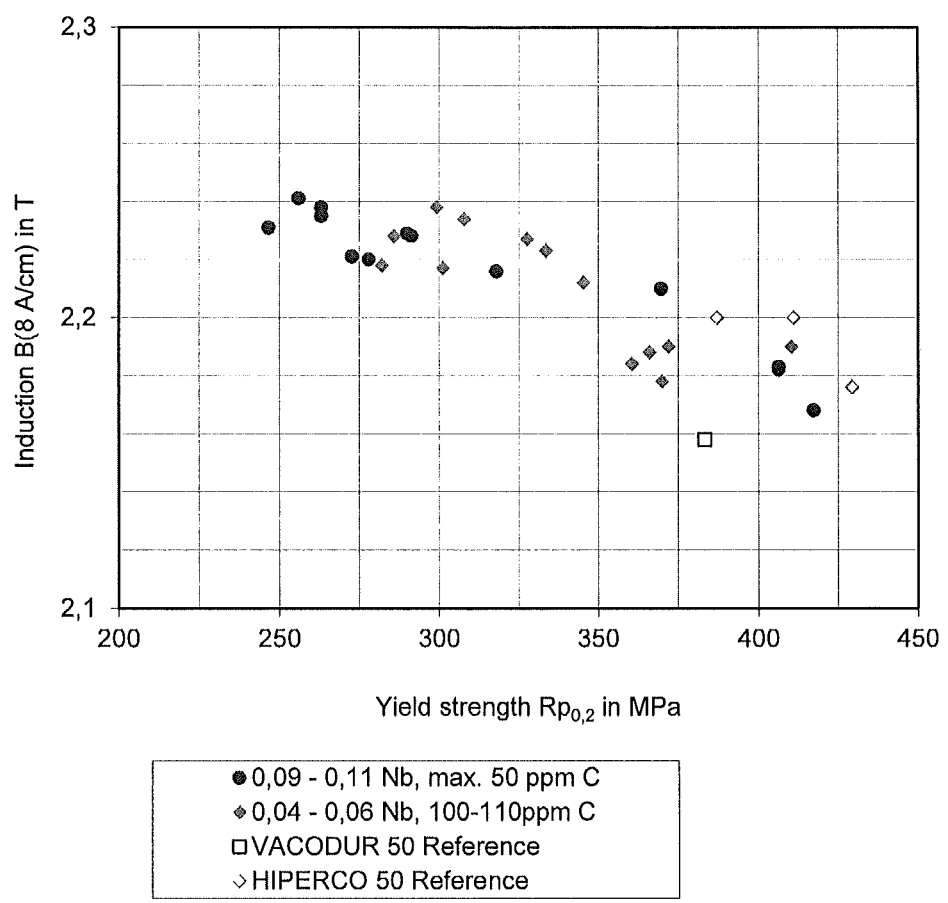
FIG. 12 illustrates a graph of induction B(8 A/cm) vs. Yield strength for (a) a sample alloy with 0.09-0.11% Nb and max. 50 ppm carbon, (b) 0.04-0.06% Nb and 100-110ppm carbon (a HIPERCO 50-like composition), (c) VACODUR 50 comparison data, (d) HIPERCO 50 comparison data.

FIG. 12 illustrates a graph of induction B(8 A/cm) vs. yield strength for (a) sample alloys with 0.09-0.11% Nb and max. 50 ppm C, (b) sample alloys with 0.04-0.06% Nb and 100-110 ppm C (a HIPERCO 50-like alloy), (c) VACODUR 50 comparison data, (d) HIPERCO 50 comparison data.

FIG. 12 illustrates that the low carbon content alloys have a magnetic induction of greater than 2.22 T up to a yield strength of around 300 MPa.

Figure 13:
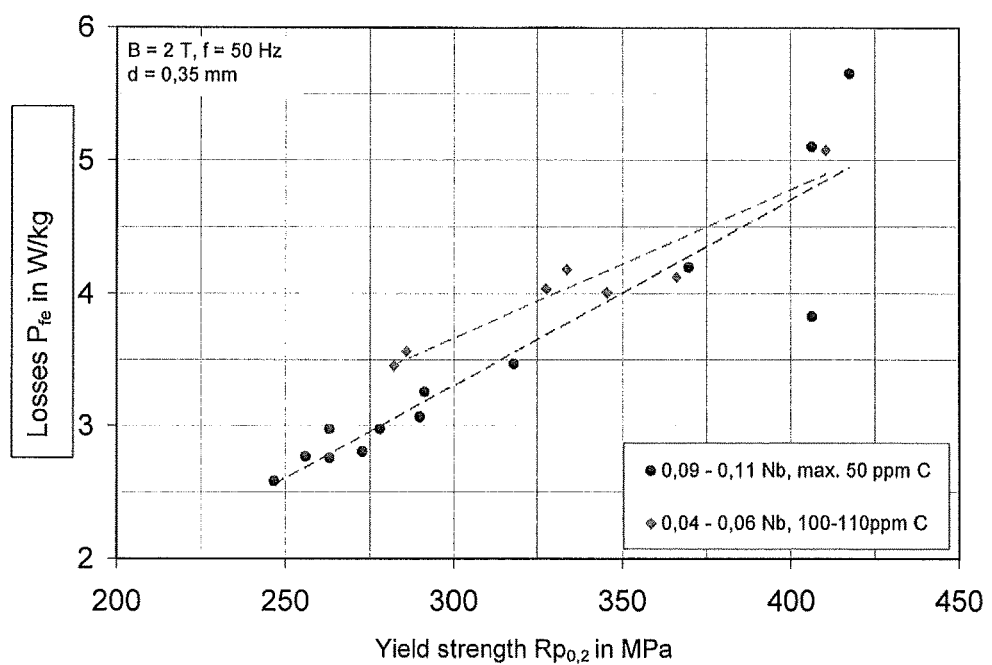
FIG. 13 illustrates a graph of losses at 2 T und 50 Hz vs. Yield strength for (a) a sample alloy with 0.09-0.110 Nb, max. 50 ppm carbon, and (b) a sample alloy with 0.04-0.06% Nb, 100-110 ppm carbon (a HIPERCO 50-like composition).

FIG. 13 illustrates a graph of losses at 2 T und 50 Hz vs. yield strength for (a) sample alloys with 0.09-0.11% Nb and max. 50 ppm C, und (b) sample alloys with 0.04-0.06% Nb and 100-110 ppm C (a HIPERCO 50-like alloy).

Figure 14:
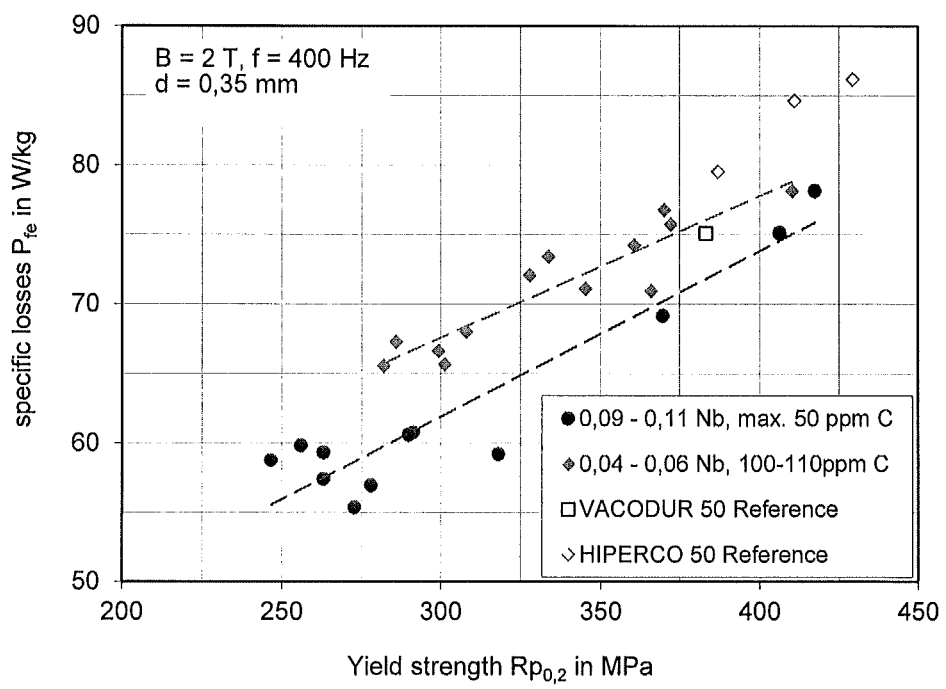
FIG. 14 illustrates a graph of losses at 2 T und 400 Hz vs. Yield strength for (a) a sample alloy with 0.09-0.110 % Nb, max. 50 ppm carbon, (b) a sample alloy with 0.04-0.06% Nb, 100-110 ppm carbon (a HIPERCO 50-like alloy), (c) VACODUR 50 comparison data, (d) HIPERCO 50 comparison data.

FIG. 14 illustrates a graph of losses at 2 T und 400 Hz vs. yield strength for (a) sample alloys with 0.09-0.11% Nb and max. 50 ppm C, (b) sample alloys with 0.04-0.06% Nb and 100-110 ppm C (HIPERCO 50-like), (c) VACODUR 50 comparison data, (d) HIPERCO 50 comparison data.

FIGS. 13 and 14 illustrate losses at 50 Hz and 400 Hz. In both cases, the losses are lower for the samples with a low carbon content then for the samples with a higher carbon content.

Table 3 summarizes the composition, annealing conditions, magnetic properties and mechanical properties of the sample alloys produced and investigated.

In a third set of embodiments, the development of the microstructure in an alloy according to the invention was investigated. The sample 93/8603 is according to the invention and sample 93/8605 has a composition similar to the commercial Hiperco 50 alloy and is a comparison alloy.

The mechanical properties, magnetic properties and the measured grain size of these two alloys after annealing treatments at different temperatures are summarised in Table 2.

After annealing at 750° C., sample 1 has a high yield strength of 474 MPa and a coercive field strength of 1.9 A/cm whereas the Hiperco-like comparison alloy has yield strength of 422 MPa and a coercive field strength of 1.17 A/cm. The grain size of 7 to 10 pm of sample 1 is fine and not completely re-crystallized whereas the Hiperco-like comparison alloy is completely re-crystallized and has slightly larger grains.

For a higher annealing temperature of 750° C., both alloys are completely re-crystallised and the mechanical and magnetic properties of the two samples are similar.

After annealing at 820° C., sample 1 has a lower yield strength but better magnetic values than the Hiperco-like comparison sample.

For an annealing temperature of 850° C., the mechanical and magnetic properties of both samples are similar.

Figure 15:
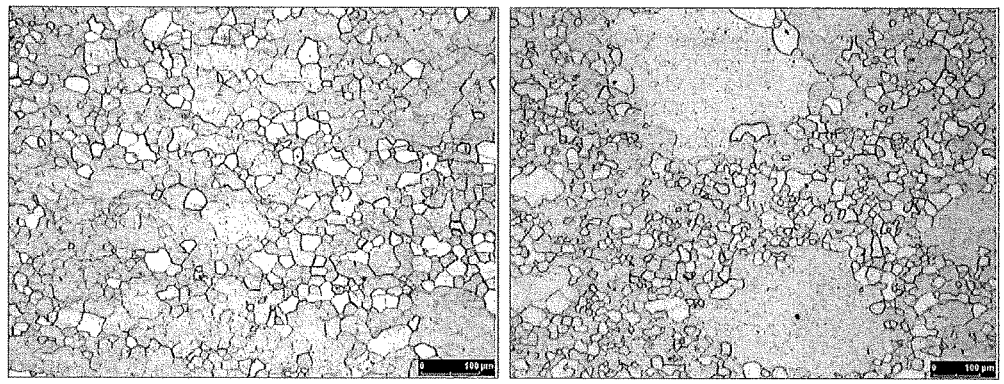
FIG. 15 illustrates optical micrographs of a sample alloy according to the invention and a Hiperco 50-like sample alloy after annealing for 4 h at 850° C.

FIG. 15 illustrates optical micrographs of a sample alloy according to the invention and a reference (Hiperco 50-like) sample alloy after annealing for 4 h at 850° C.

Sample 1 has a relatively homogenous microstructure with grains having average size of 27 to 30 µm. The Hiperco-like comparison alloy has some isolated huge grains and a more inhomogeneous microstructure is observed. If the large grains are ignored, the average grain sizes around 18 to 22 µm.

In a fourth set of embodiments, a possible effect of the carbon content on the oxygen content was investigated.

Figure 16:
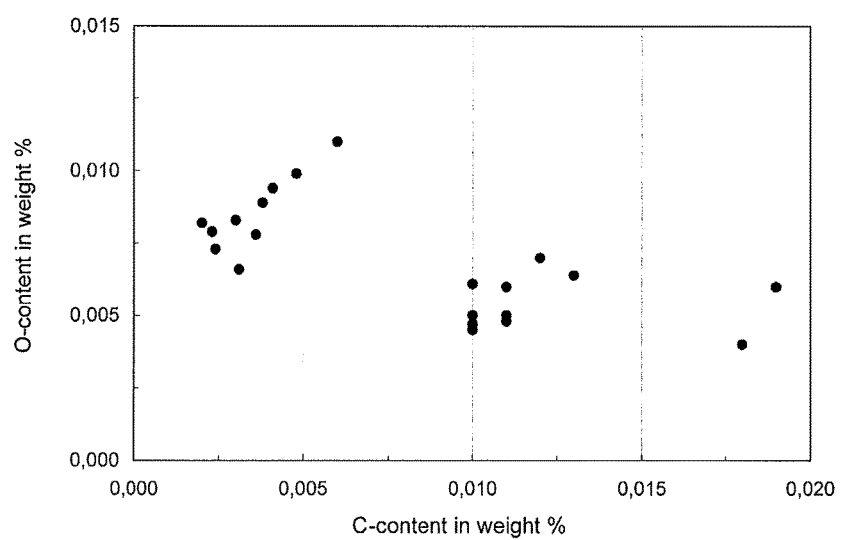
FIG. 16 illustrates a graph of t oxygen content as a function of carbon content for three sample alloys.

FIG. 16 illustrates a graph of oxygen content as a function of carbon content for the sample alloys 93/8285-8288, 93/8485-93/8491, 93/8598-8600. FIG. 16 illustrates that the oxygen content tends to increase for lower carbon contents which may lead to the formation of oxide inclusions in the alloy.

To provide a light desoxidation effect, 0.05 weight percent manganese and 0.05 weight percent silicon were added to some of the alloys. However, when these elements were omitted, an increase in the oxygen content was not observed. However, no disadvantageous effect on the magnetic properties was observed.

In a fifth set of embodiments, the effect of the yield strength as a function of temperature was investigated for a sample having a composition according to the invention and a comparison Hiperco-like sample.

Figure 17:
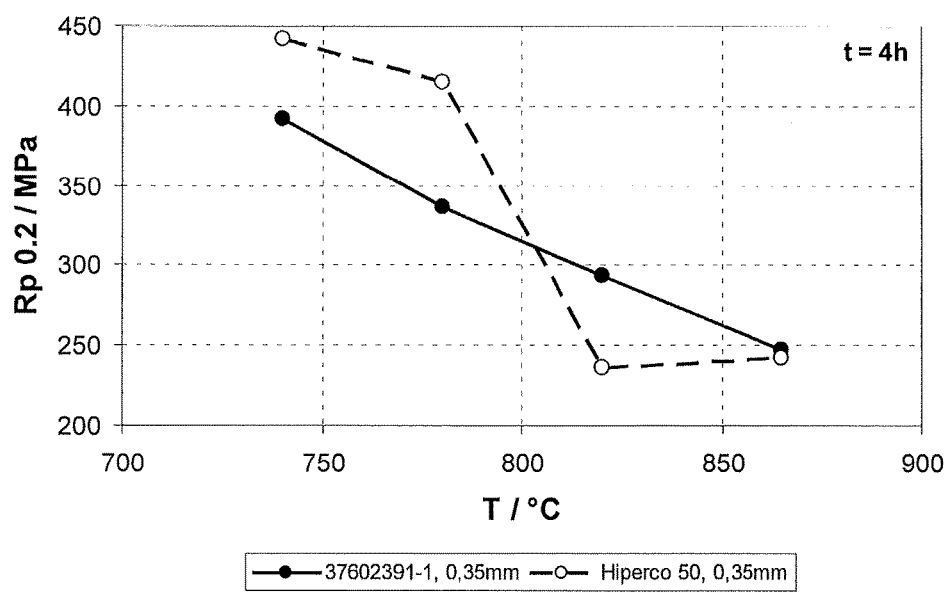
FIG. 17 illustrates a graph of yield strength vs annealing temperature.

FIG. 17 illustrates a graph of yield strength vs annealing temperature. FIG. 17 illustrates that for the sample according to the invention, the relationship between the yield strength and the annealing temperature is generally linear, whereas for the comparison Hiperco-like sample, there is a steep drop in the yield strength between 780° C. and 820° C.

The linear form of the decrease in yield strength with increasing temperature is useful in that any variation in the annealing temperature within the furnace during production of the semi-finished parts leads to predictable rather unpredictable results. Therefore, variations in temperature can be compensated.

Table 4 illustrates the compositions of the alloys used in the embodiment illustrated in FIG. 17 and Table 5 illustrates values of the yield strength illustrated in the graph of FIG. 18.

FIG. 18 illustrates a SEM (Scanning Electron Microscopy) micrograph of a first comparison sample with 0.26 weight percent niobium and 31 ppm carbon. The sample was annealed at 750° C. for 3 hours. This comparison sample includes mainly Laves phases which can be seen in the micrograph as the bright and comparatively large inclusions having a size of greater than around 50 nm.

Figure 19:
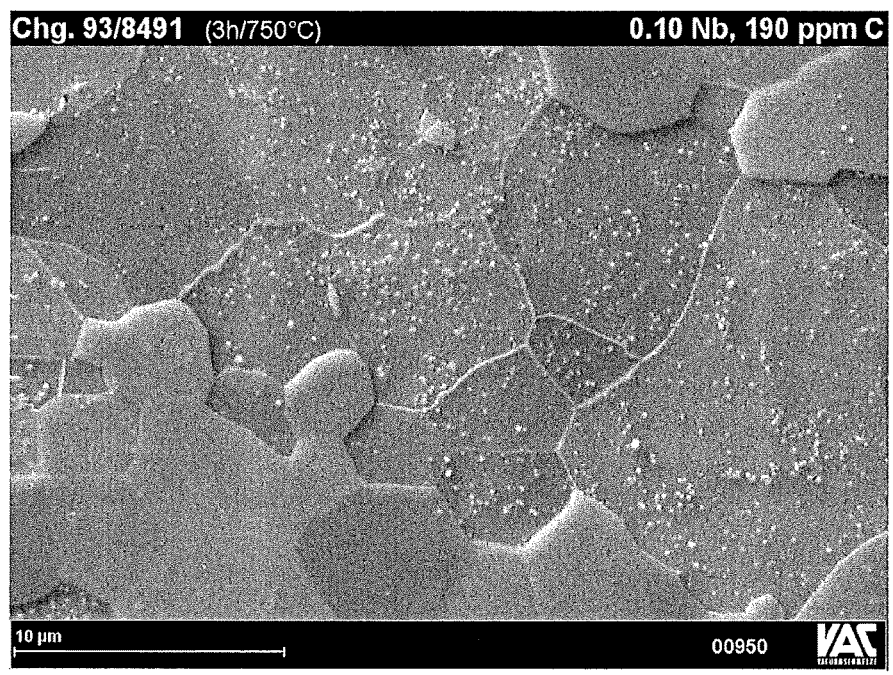
FIG. 19 illustrates a SEM micrograph of a comparison sample.

FIG. 19 illustrates a SEM micrograph of a second comparison sample with a lower niobium content of 0.1 weight percent and a higher carbon content of 190 ppm. This sample was also annealed at 750° C. for 3 hours. In contrast to the first comparison sample, the second comparison sample includes mainly carbides as shown by the much smaller brighter inclusions. These inclusions differ from the Laves phase inclusions by their smaller size of less than 50 nm.

Figure 20:
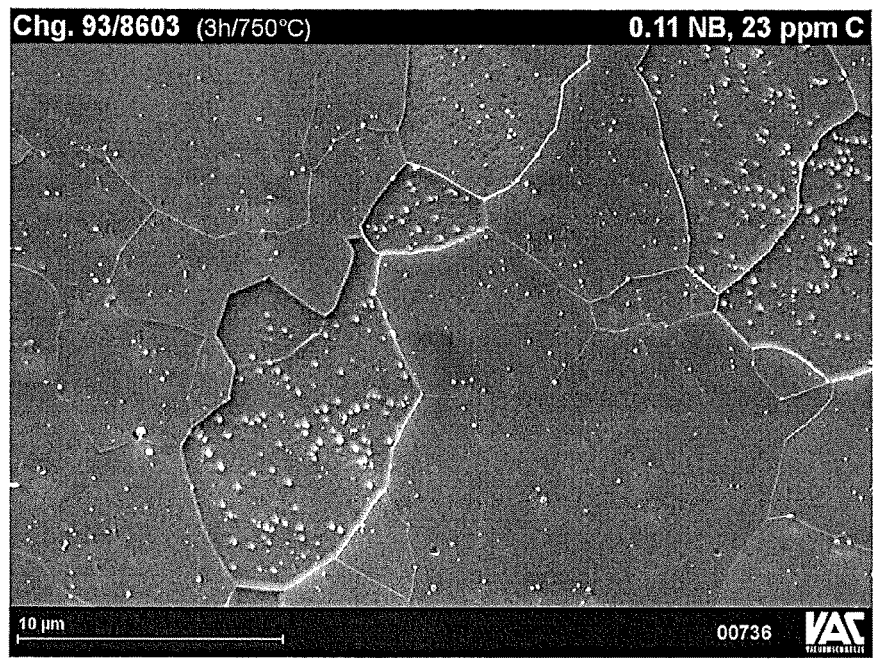
FIG. 20 illustrates a SEM micrograph of a sample alloy according to the invention.

FIG. 20 illustrates a SEM micrograph of an alloy according to the invention with a niobium content of 0.11 weight percent and a carbon content of 23 ppm. This sample was also annealed at 750° C. for 3 hours. The alloy includes mainly Laves phases as is illustrated by the bright inclusions within the grains.

Figure 21:
FIG. 21 illustrates a SEM micrograph of a comparison sample.

FIG. 21 illustrates a SEM micrograph of a third comparison alloy with a lower niobium content of 0.06 weight percent and a higher carbon content of 100 ppm which was annealed at 750° C. for 3 hours. This comparison alloy includes mainly carbide phases as is illustrates by the smaller bright inclusions.

The invention having been described herein with respect to certain specific embodiments, it will be understood that these embodiments are intended to illustrate, not limit, the scope of the appended claims.

TABLE 1

| Material | T °C. | t h | H, A/cm | B(8 A/cm) T | $P_{Fe}$(2T; 400 Hz) W/kg | $Rp_{0.2}$ MPa |
|---|---|---|---|---|---|---|
| Hiperco 50 | 750 | 3 | 1.13 | 2.126 | 86 | 429 |
|  | 788 | 3 | 1.02 | 2.150 | 85 | 411 |
|  | 820 | 4 | 0.93 | 2.150 | 80 | 387 |
|  | 871 | 2 | 0.46 | 2.197 | 67 | 188 |
| VACODUR 50 | 750 | 3 | 1.628 | 2.050 | 90 | 468 |
|  | 820 | 3 | 0.998 | 2.108 | 75 | 383 |

TABLE 2

| | 93/8603: "VACODUR 49" 0.11% Nb, 23 ppm C | | | | 93/8605: like "Hiperco 50" 0.06% Nb, 100 ppm C | | | |
|---|---|---|---|---|---|---|---|---|
| anneal | $Rp_{0.2}$ MPa | Hc A/cm | B(3 A/cm) T | Grain Size µm | $Rp_{0.2}$ MPa | Hc A/cm | B(3 A/cm) T | Grain size µm |
| 2 h 730° C. | 474 | 1.90 | 1.520 | 7-10 | 422 | 1.17 | 1.935 | 9-12 |
| 3 h 750° C. | 417 | 1.19 | 1.935 | 8-16 | 410 | 1.02 | 1.989 | 10-12.5 |
| 4 h 820° C. | 318 | 0.66 | 2.018 | — | 366 | 0.71 | 1.973 | — |
| 4 h 850° C. | 273 | 0.54 | 2.025 | 27-30 | 282 | 0.61 | 2.024 | 18-22 |

TABLE 3

| Batch | Co % | V % | Ni % | Nb % | C % | anneal | Hc A/cm | B3 T | B8 T | B80 T | P2; 50 W/kg | P2; 400 W/kg | E GPa | Rp02 Mpa | Rm MPa | A % | HV10 | ΔRp02 MPa |
|---|---|---|---|---|---|---|---|---|---|---|---|---|---|---|---|---|---|---|
| 9308285B | 49.25 | 1.83 | 0.06 | 0.06 | 0.0110 | 3 h 750° C. | 0.94 | 1.982 | 2.134 | 2.290 | — | 74.3 | 217 | 361 | 822 | 10.3 | — | 59 |

TABLE 3-continued

| Batch | Co % | V % | Ni % | Nb % | C % | anneal | Hc A/cm | B3 T | B8 T | B80 T | P2; 50 W/kg | P2; 400 W/kg | E GPa | Rp02 Mpa | Rm MPa | A % | HV10 | ΔRp02 MPa |
|---|---|---|---|---|---|---|---|---|---|---|---|---|---|---|---|---|---|---|
| | | | | | | 2 h 871° C. | 0.65 | 2.032 | 2.167 | 2.292 | — | 65.6 | 211 | 301 | 687 | 8.5 | — | |
| 9308286B | 48.55 | 1.83 | 0.05 | 0.06 | 0.0110 | 3 h 750° C. | 0.94 | 1.983 | 2.140 | 2.285 | — | 75.7 | 216 | 372 | 786 | 9.2 | — | 64 |
| | | | | | | 2 h 871° C. | 0.61 | 2.054 | 2.184 | 2.289 | — | 68.0 | 221 | 308 | 673 | 8.1 | — | |
| 9308287B | 48.55 | 1.84 | 0.06 | 0.06 | 0.0100 | 3 h 750° C. | 0.95 | 1.961 | 2.128 | 2.285 | | 76.7 | 220 | 370 | 778 | 9.1 | — | 71 |
| | | | | | | 2 h 871° C. | 0.62 | 2.056 | 2.188 | 2.289 | — | 66.6 | 217 | 299 | 674 | 8.1 | | |
| 9308288B | 49.35 | 1.82 | 0.04 | 0.06 | 0.0120 | 3 h 750° C. | 1.09 | 1.951 | 2.116 | 2.281 | — | 79.8 | 223 | 385 | 729 | 7.9 | — | 43 |
| | | | | | | 2 h 871° C. | 0.70 | 2.033 | 2.166 | 2.284 | — | 67.2 | 213 | 328 | 648 | 7.2 | — | |
| 9308604 | 48.85 | 1.87 | 0.04 | 0.06 | 0.0038 | 3 h 750° C. | 0.81 | 2.008 | 2.155 | 2.279 | 4.11 | 69.2 | 230 | 384 | 839 | 10.5 | 224 | 144 |
| | | | | | | 2 h 871° C. | 0.37 | 2.068 | 2.192 | 2.280 | 2.27 | 55.4 | 187 | 240 | 486 | 5.9 | 179 | |
| 9308605 | 48.85 | 1.89 | 0.04 | 0.06 | 0.0100 | 3 h 750° C. | 1.02 | 1.989 | 2.140 | 2.280 | 5.07 | 78.1 | 245 | 410 | 809 | 9.0 | 233 | 124 |
| | | | | | | 2 h 871° C. | 0.64 | 2.045 | 2.178 | 2.281 | 3.57 | 67.3 | 179 | 286 | 623 | 7.0 | 200 | |
| 9308601 | 48.65 | 1.89 | 0.04 | 0.09 | 0.0180 | 3 h 750° C. | 1.41 | 1.918 | 2.101 | 2.273 | 6.87 | 96.1 | 215 | 441 | 857 | 9.4 | 233 | 108 |
| | | | | | | 2 h 871° C. | 1.02 | 2.005 | 2.152 | 2.280 | 5.16 | 82.0 | 197 | 333 | 613 | 5.8 | 224 | |
| 9308489 | 48.55 | 1.84 | 0.01 | 0.10 | 0.0100 | 3 h 750° C. | 1.10 | 1.982 | 2.140 | 2.284 | 5.41 | 83.5 | 267 | 433 | 729 | 7.0 | — | 128 |
| | | | | | | 2 h 871° C. | 0.59 | 2.039 | 2.180 | 2.290 | 3.51 | 68.9 | 225 | 304 | 644 | 7.2 | — | |
| 9308490 | 48.50 | 1.84 | 0.01 | 0.10 | 0.0130 | 3 h 750° C. | 1.47 | 1.914 | 2.098 | 2.278 | 7.91 | 102.5 | 238 | 445 | 804 | 8.4 | — | 118 |
| | | | | | | 2 h 871° C. | 0.68 | 2.046 | 2.180 | 2.288 | 3.99 | 70.0 | 213 | 327 | 685 | 7.4 | — | |
| 9308491 | 48.55 | 1.84 | 0.01 | 0.10 | 0.0190 | 3 h 750° C. | 1.69 | 1.847 | 2.073 | 2.277 | 6.96 | 94.4 | 249 | 475 | 920 | 10.1 | — | 75 |
| | | | | | | 2 h 871° C. | 1.25 | 1.967 | 2.129 | 2.282 | 6.11 | 88.4 | 225 | 401 | 887 | 10.6 | — | |
| 9308603 | 48.70 | 1.87 | 0.04 | 0.11 | 0.0023 | 3 h 750° C. | 1.19 | 1.935 | 2.118 | 2.273 | 5.65 | 78.2 | 216 | 417 | 810 | 9.2 | 232 | 145 |
| | | | | | | 2 h 871° C. | 0.50 | 2.026 | 2.171 | 2.279 | 2.81 | 55.4 | 181 | 273 | 592 | 7.3 | 186 | |
| 9308599 | 48.65 | 1.87 | 0.05 | 0.13 | 0.0030 | 3 h 750° C. | 1.30 | 1.883 | 2.096 | 2.266 | 6.05 | 82.0 | 226 | 444 | 825 | 8.9 | 227 | 166 |
| | | | | | | 2 h 871° C. | 0.56 | 1.997 | 2.156 | 2.277 | 3.00 | 59.1 | 199 | 278 | 588 | 7.1 | 194 | |
| 9308606 | 48.70 | 1.79 | 0.04 | 0.26 | 0.0031 | 3 h 750° C. | 2.00 | 1.469 | 1.965 | 2.236 | 10.24 | 113.8 | 210 | 491 | 939 | 9.9 | 260 | 126 |
| | | | | | | 2 h 871° C. | 1.27 | 1.902 | 2.098 | 2.251 | 5.91 | 80.4 | 207 | 365 | 721 | 7.6 | 221 | |

TABLE 3-continued

| Batch | Co % | V % | Ni % | Nb % | C % | anneal | Hc A/cm | B3 T | B8 T | B80 T | P2; 50 W/kg | P2; 400 W/kg | E GPa | Rp02 Mpa | Rm MPa | A % | HV10 | ΔRp02 MPa |
|---|---|---|---|---|---|---|---|---|---|---|---|---|---|---|---|---|---|---|
| 9308607 | 48.90 | 1.87 | 0.04 | 0.32 | 0.0100 | 3 h 750° C. | 1.75 | 1.656 | 2.021 | 2.248 | 8.62 | 107.0 | 209 | 473 | 935 | 10.2 | 252 | 107 |
|  |  |  |  |  |  | 2 h 871° C. | 1.39 | 1.871 | 2.088 | 2.254 | 6.31 | 85.4 | 244 | 366 | 731 | 7.7 | 216 |  |

Composition in weight percent, B3 = B(3 A/cm); B8 = B(8 A/cm); B80 = B(80 A/cm), with air flow correction
P2; 50 = P(2.0 T; 50 Hz); P2; 400 = P(2.0 T; 400 Hz); tape thickness 0.35 mm E = E-Modulus; Rp02 = yield strength; Rm = ultimate tensile strength; A = elongation to fracture; HV10 = Vickers hardness ΔRp0.2 = Rp0.2 (3 h 750° C.) - Rp0.2 (2 h 871° C.)

TABLE 4

| Batch | Fe | Co | V | Nb | C |
|---|---|---|---|---|---|
| 37602391-1 | Rest | 48.55 | 1.80 | 0.09 | <0.0030 |
| Hiperco 50 | Rest | 48.55 | 1.87 | 0.05 | 0.0070 |

TABLE 5

| Batch | d/mm | T/° C. | Rp0.2\|MPa |
|---|---|---|---|
| 37602391-1 | 0.35 | 740 | 392 |
|  |  | 780 | 337 |
|  |  | 820 | 294 |
|  |  | 865 | 247 |
| Hiperco 50 | 0.35 | 740 | 442 |
|  |  | 780 | 415 |
|  |  | 820 | 236 |
|  |  | 865 | 242 |

The invention claimed is:

1. A soft magnetic alloy consisting of 47 weight percent≤Co≤50 weight percent, 1 weight percent≤V≤3 weight percent, 0 weight percent≤Ni≤0.2 weight percent, 0.08 weight percent≤Nb≤0.12 weight percent, 0 weight percent≤C≤0.007 weight percent, 0 weight percent≤Mn≤0.1 weight percent, 0 weight percent≤Si≤0.1 weight percent, up to 0.5 weight percent impurities selected from the group consisting of one or more of Cr, Cu, Mo, Al, S, Ti, Ce, B, N, Mg, Ca, P and mixtures thereof, remainder Fe,
wherein the soft magnetic alloy has a yield strength (0.2% strain) of between 200 MPa and 450 MPa in an annealed state,
wherein the soft magnetic alloy has a resistivity of at least 0.4 μΩm, or an induction B(8 A/cm) of at least 2.12 T, or both, and
wherein in an annealed state, the soft magnetic alloy comprises a yield strength (0.2% strain) that lies within ±10% of a linear function of yield strength (0.2% strain) against annealing temperature at a given annealing time over an annealing temperature range of 730° C. to 900° C.

2. The soft magnetic alloy according to claim 1, wherein the alloy has a nickel content such that 0 weight percent<Ni≤0.2 weight percent.

3. The soft magnetic alloy according to claim 1, wherein the alloy has a manganese content such that 0 weight percent<Mn≤0.07 weight percent.

4. The soft magnetic alloy according to claim 1, wherein the alloy has a silicon content of 0 weight percent<Si≤0.07 weight percent.

5. The soft magnetic alloy according to claim 1, wherein the soft magnetic alloy has a yield strength (0.2% strain) that is a linear function of annealing temperature over an annealing temperature range of 740° C. to 865° C.

6. The soft magnetic alloy according to claim 1, wherein the soft magnetic alloy has a resistivity of at least 0.4 μΩm.

7. The soft magnetic alloy according to claim 1, wherein the soft magnetic alloy has an induction B(8 A/cm) of at least 2.12 T.

8. The soft magnetic alloy according to claim 1, wherein the soft magnetic alloy has an induction B(8 A/cm) of at least 2.12 T and a yield strength of at least 370 MPa.

9. The soft magnetic alloy according to claim 1, wherein after annealing at a temperature in the range of 720° C. to 900° C., the soft magnetic alloy has a yield strength in the range of 200 MPa and 450 MPa, and a power loss density at 2 T and 400 Hz of less than 90 W/kg.

10. The soft magnetic alloy according to claim 1, wherein the yield strength of the soft magnetic alloy is adjustable over a range of at least 130 MPa after having been annealed at 750° C. or at 871° C.

11. A stator for an electric motor, comprising the soft magnetic alloy according to claim 1.

12. A rotor for an electric motor, comprising the soft magnetic alloy according to claim 1.

13. An electric motor comprising a stator and rotor, each comprising a soft magnetic alloy according to claim 1.

14. A method for manufacturing a rotor for an electric motor comprising providing the soft magnetic alloy according to claim 1 and annealing at a temperature of 730 to 790° C.

15. A method for manufacturing a stator for an electric motor comprising providing the soft magnetic alloy according to claim 1 and annealing at a temperature of 800° C. to 880° C.

16. The soft magnetic alloy according to claim 1, wherein the alloy has a carbon content such that 0 weight percent≤C<0.005 weight percent.

17. The soft magnetic alloy according to claim 1, wherein the alloy has a carbon content such that 0 weight percent<C≤0.005 weight percent.

18. The soft magnetic alloy according to claim 17, wherein the alloy has a carbon content such that 0 weight percent<C<0.003 weight percent.

19. The soft magnetic alloy according to claim 1, wherein oxygen is present as an impurity in an amount up to 0.009 weight percent.

20. A method for manufacturing a soft magnetic alloy, comprising providing a melt consisting of 47 weight percent≤Co≤50 weight percent, 1 weight percent≤V≤3 weight percent, 0 weight percent≤Ni≤0.2 weight percent, 0.08 weight percent≤Nb≤0.12 weight percent, 0 weight percent≤C≤0.007 weight percent, 0 weight percent≤Mn≤0.1 weight percent, 0 weight percent≤Si≤0.1 weight percent, up to 0.5 weight percent impurities selected from the group consisting of one or more of Cr, Cu, Mo, Al, S, Ti, Ce, B, N, Mg, Ca, P and mixtures thereof, remainder Fe;

cooling and solidifying the melt and forming a blank;

hot rolling the blank followed by cold rolling the blank, and subsequently annealing at least a portion of the blank at a temperature in the range of 730° C. to 880° C. for a time sufficient to obtain a soft magnetic alloy having a yield strength (0.2% strain) of between 200 MPa and 450 MPa in an annealed state, either a resistivity of at least 0.4 μΩm, or an induction B(8 A/cm) of at least 2.12 T, or both, and wherein in an annealed state, the soft magnetic alloy comprises a yield strength (0.2% strain) that lies within ±10% of a linear function of yield strength (0.2% strain) against annealing temperature at a given annealing time over an annealing temperature range of 730° C. to 900° C.

21. The method according to claim 20, wherein at least a portion of the blank is annealed at a temperature in the range of 740° C. to 865° C.

22. The method according to claim 20, wherein at least a portion of the blank is annealed at a temperature in the range of 730° C. to 790° C. or in the range of 800° C. to 880° C.

23. The method according to claim 20, wherein the hot rolling of the blank produces a thickness reduction in the blank of 90%.

24. The method according to claim 20, wherein the hot rolling of the blank includes rolling at a temperature in the range of 1100° C. to 1300° C.

25. The method according to claim 20, further comprising, after hot rolling, cooling the blank to a temperature of above 730° C. and then quenching to room temperature, or cooling the blank and reheating to a temperature above 730° C., and then quenching to room temperature.

26. The method according to claim 20, further comprising pickling the blank before cold rolling.

27. The method according to claim 20, wherein the cold rolling of the blank produces a thickness reduction in the blank of 90%.

28. The method according to claim 20, wherein after cold rolling, the blank has a thickness in the range of 0.3 mm to 0.4 mm.

29. A method for manufacturing a semi-finished part comprising forming a blank according to the method according to claim 20 and separating a portion of the blank to produce a semi-finished part.

30. The method according to claim 29, further comprising assembling a plurality of semi-finished parts manufactured by the method according to claim 28 and forming a laminated soft magnetic article.

* * * * *